United States Patent [19]

Franke et al.

[11] Patent Number: 4,540,555

[45] Date of Patent: Sep. 10, 1985

[54] METHOD OF REMOVING SULFUR DIOXIDE AND OTHER TOXIC AND NOXIOUS COMPONENTS FROM FLUE GASES

[75] Inventors: Paul W. U. Franke, Essen; Wolfgang Glaser, Frechen; Georg R. U. Gebhard, Reichshof; Klaus R. G. Hein, Bergheim-Ahe, all of Fed. Rep. of Germany

[73] Assignee: Rheinisch-Westfalisches Elektrizitatswerk Aktiengesellschaft, Essen, Fed. Rep. of Germany

[21] Appl. No.: 526,903

[22] Filed: Aug. 26, 1983

[30] Foreign Application Priority Data

Aug. 28, 1982 [DE] Fed. Rep. of Germany ....... 3232077

[51] Int. Cl.³ .............................................. C01B 17/00
[52] U.S. Cl. .................................... 423/242; 423/166; 423/555
[58] Field of Search .............. 423/242 A, 242 R, 243, 423/244 A, 244 R, 166, 555; 110/343

[56] References Cited

U.S. PATENT DOCUMENTS

| 3,520,649 | 7/1970 | Tomany et al. | 423/242 |
| 4,185,080 | 1/1980 | Rechmeier | 110/343 X |
| 4,190,421 | 2/1980 | Hwa | 110/343 X |
| 4,309,393 | 1/1982 | Nguyen et al. | 423/244 |
| 4,388,281 | 6/1983 | Holter et al. | 423/243 |
| 4,397,742 | 8/1983 | Minnick | 423/244 |

FOREIGN PATENT DOCUMENTS 3001258 1/1980 Fed. Rep. of Germany.

*Primary Examiner*—Gregory A. Heller
*Attorney, Agent, or Firm*—Karl F. Ross; Herbert Dubno

[57] ABSTRACT

A method of and an apparatus for the desulfurization of the flue gases from a fossil fuel power plant. A particulate absorbent is contacted with the flue gases in a dry desulfurization step, particulates being then separated from the flue gas and being utilized in part as a secondary absorbent in a subsequent scrubbing of the flue gas. The sludge from the wet scrubbing is combined with the remainder of the dried particles from the separator to form a settable composition.

5 Claims, 1 Drawing Figure

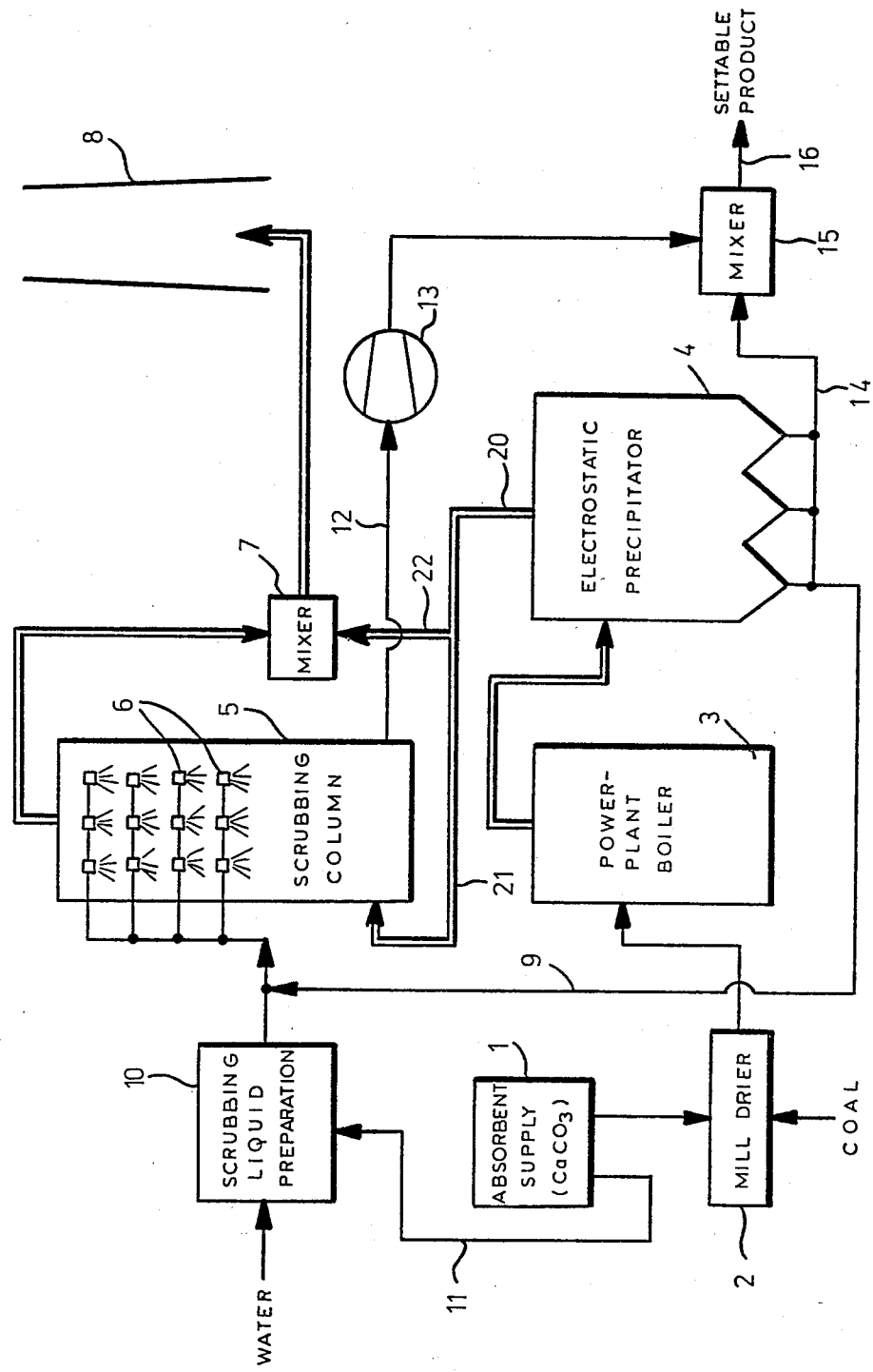

METHOD OF REMOVING SULFUR DIOXIDE AND OTHER TOXIC AND NOXIOUS COMPONENTS FROM FLUE GASES

CROSS REFERENCE TO RELATED APPLICATIONS

This application is related to the commonly assigned copending applications Ser. No. 526,904 based upon German application No. P 32 32 080.9; Ser. No. 526,907 based upon German application No. P 32 32 081.7; Ser. No. 526,886 based upon German application No. P 32 32 079.5; and Ser. No. 526,910 based upon German application No. P 32 32 078.7; all of these German applications have been filed Aug. 28, 1982 and all of the U.S. applications being filed concurrently herewith.

FIELD OF THE INVENTION

Our present invention relates to a method of desulfurization of flue gases and, more particularly, to a method of removing sulfur dioxide and other toxic and noxious components from the flue gases of a fossil-fuel combustion and particularly from the flue gases of a fossil-fuel power plant boiler.

BACKGROUND OF THE INVENTION

It is known, in the operation of fossil-fuel power plants and especially power plants fueled with liquid or solid fuels, to provide desulfurizing means or the like for the removal of sulfur dioxide and other noxious and toxic components from the flue gases before they are released into the atmosphere.

A typical gas-cleaning installation for this purpose will generally comprise a solid/gas separator adapted to remove particulates from the flue gases as they come from the combustion chamber, and a scrubber or washing column or the like for the wet desulfurization of the flue gases.

In the latter part of the apparatus, the flue gases are scrubbed with a scrubbing liquid containing a finely divided absorbent which can be solubilized or suspended as fine particles therein.

From the scrubbing liquid, a solid residue can be settled by sedimentation or the like which comprises the reaction product of the absorbent which is generally a calcium-containing compound. This residue thus can be rich in gypsum ($CaSO_4 \, 2H_2O$) and can be referred to as residual gypsum.

When reference is made to an absorbent herein, we intend to thereby designate such finely divided, particulate inorganic alkaline earth compounds, especially the calcium compounds but also magnesium compounds which can be used as an alternative to the calcium compounds but more commonly are used in conjunction with the calcium compounds. The compounds are usually in the form of the oxides, hydroxides or carbonates.

The preferred absorbent, at least the preferred virgin absorbent, as far as the present invention is concerned, is calcium carbonate. Thus when a virgin absorbent is referred to herein subsequently, unless otherwise indicated, calcium carbonate will be intended.

The reactivity and the efficiency of absorption of the absorbent to sulfur dioxide and the other toxic and noxious components can be improved by the combination of selective additives with the absorbent as will be apparent from the aforementioned applications, and the scrubbing liquid is generally water.

In most of the prior art systems, the finely divided particulate absorbent in virgin form is added to the scrubbing liquid and the recovered residual gypsum is not usable without further treatment.

The residue must be disposed of by expensive processes or treated to render it useful as a structural material. Treatments include dehydration or so-called calcination.

Mention should also be made of the fact that it is also known to effect a dry desulfurization of flue gases, i.e. to provide a process for the dry removal of sulfur dioxide and other noxious and toxic components from flue gases of fossil-fuel power plant boiler combustion chambers.

In such processes, a finely divided dry particulate absorbent or granules thereof can be added to the fuel, e.g. bituminous coal or lower rank coals such as brown coal (see German Pat. No. DE-PS 28 07 076 and the corresponding U.S. Pat. No. 4,262,610).

The fuel and the absorbent can be milled together and injected in a homogeneous form into the combustion chamber through the burner.

The solid reaction product and other particulates in the gas stream are then subjected to a dry removal therefrom, e.g. in an electrostatic precipitator, and generally speaking this solid residue is disposed of in some fashion.

The wet scrubbing process and the dry desulfurization process thus have existed side by side in the field of flue gas cleaning and have not had any type of interrelationship of significance heretofore. Both have their advantages and their disadvantages and generally one must select one of these processes or the other as the cleaning approach.

Indeed, there are a number of considerations which influence the choice of the wet scrubbing process or the dry desulfurization process.

The wet scrubbing process has the advantage of high efficiency. It operates with only a limited stoichiometric excess of the absorbent. However, it has disadvantages as well. For example, it results in a cooling of the scrubbing gas to the saturation temperature, a temperature which, in the case of the flue gases of fossil-fuel power plants is generally around 50° C. This temperature is below the dew point of the flue gas. A reheating of the flue gas may be necessary for proper discharge of the gases into the atmosphere and from an environmental view point or to permit use of any other valuable component of the flue gas. Reheating, however, requires considerable energy and hence raises the cost of the process significantly whether external energy sources are used or expensive regenerative heat exchangers are installed.

The dry process has the disadvantage that the desulfurization efficiency is substantially lower and hence the stoichiometric excess must be considerably greater by many times so as to ensure effective removal of the sulfur dioxide and the other toxic and noxious components.

This is a result, at least in part, of the comparatively short residence time of the absorbent with the flue gas, even if this contact is initiated immediately upon the formation of the flue gas by incorporation of the absorbent in the fuel. The utilization of the absorbent is poor and; consequently, significant cost is encountered because of the need to use large amounts of the absorbent.

However, the amount of the absorbent which can be added to the fuel is not limited since the absorbent may overload the combustion process and such overloading thus sets an upper limit for the amount of dry absorbent which can be utilized.

OBJECTS OF THE INVENTION

It is the principal object of the present invention to provide an improved desulfurization process which is especially effective for fossil-fuel power plant flue gases whereby the disadvantages of earlier systems are avoided.

Another object of the invention is to provide a method of removing sulfur dioxide and other noxious and toxic components from the flue gases of fossil-fuel power plant boiler combustion chambers whereby the absorption is carried out more efficiently, i.e. the absorbent is more effectively used, than has hitherto been the case and disadvantages of both the wet process and the dry process are avoided.

SUMMARY OF THE INVENTION

These objects and others which will become apparent hereinafter are attained, in accordance with the invention, in a process for the cleaning of flue gases, i.e. the desulfurization or removal of sulfur dioxide and other noxious and toxic components, from the flue gases of a fossil-fuel power plant boiler combustion chamber in which, after a particle separation the flue gases are subjected to wet scrubbing with a scrubbing solution containing an adsorbent, the method comprising contacting the flue gases with a dry absorbent in finely divided particulate form and recovering the solid product by separating such solids from the flue gases after the contact. According to the invention, this solid product is utilized at least in part as a secondary absorbent in the wet desulfurization process, i.e. as an additive to the scrubbing liquid.

According to the invention, a virgin absorbent can also be introduced into the scrubbing liquid in the wet scrubbing process.

In a preferred embodiment of the invention, the virgin absorbent utilized in the dry desulfurization process, i.e. added to the fuel or to the flue gases in the initial absorption stage, and the virgin absorbent which is introduced into the wet scrubbing stage are the same.

This has been found to be especially advantageous when the virgin absorbent is calcium carbonate.

It is indeed surprising that the precipitated solids from the dry absorption stage can be introduced without further treatment as the secondary absorbent in the wet scrubbing stage.

We have found, however, that it is possible to treat the collected solids from the dry absorption stage so as to increase its reactivity as the secondary absorbent in the wet scrubbing stage.

For example, we have found that the treatment of the recovered solids with steam and/or by milling can significantly increase the reactivity and hence the efficiency of desulfurization of the solids.

One of the advantages of the invention is that the ultimate product resulting from the stages of the invention as a residue is a settable (hardenable) product which can be disposed of in an environmentally safe and effective manner. For example, it can be used directly as a hydraulic binder or other component of cement or mortar, can be combined with aggregates or used alone, and can be cast into blocks, bricks or other objects like cement or concrete.

According to a feature of the invention, the gypsum containing sludge from the wet desulfurization apparatus and any component of the dry solids which have not been utilized as secondary absorbent, can be mixed together and the mixture utilized as a building material. This product has been found to yield cast bodies of high compressive strength.

With the method of the invention, the dry desulfurization process is combined with an improved wet desulfurization process to yield a waste product which can be utilized directly as building material or disposed of in an environmentally safe manner without the problems hitherto encountered. This is of considerable significance.

Another advantage of the invention is that after the wet desulfurizaton step, a reheating of the flue gases is no longer necessary. This is ensured by branching a portion of the flue gas from the solids separator and recombining it with the wet scrub flue gas downstream of the scrubber. The proportioning of the two flows of the flow gas is such that the environmental regulatory or statutory requirements for discharge of the combined gases to the atmosphere are met insofar as the components of the gas and the gas temperature are concerned. This unique approach is possible because the hot partial stream of the flue gas, which does not undergo wet scrubbing, is already desulfurized by the dry absorption step.

The method of the invention also has numerous other advantages including the fact that the partially utilized dry absorbent is more fully utilized and indeed practically completely utilized, by its introduction into the highly efficient scrubbing system in which it constitutes the secondary absorbent.

According to the apparatus aspects of the invention, the gas cleaning installation connected to the flue gas outlet of the power plant boiler combustion chamber comprises a dry desulfurization unit and a solids separator adapted to remove solid particles, namely, the absorbent and fly ash, from the treated flue gases, and a wet scrubbing unit downstream of the dry desulfurization unit. The scrubber includes a scrubbing tower according to the invention.

According to the principles of this invention, means is provided for recovering particulate solids from the aforementioned separator and feeding such solids as the secondary absorbent into the scrubbing tower. Means is also provided, of course, for feeding the flue gases from the separator into the scrubbing tower.

The dry scrubbing unit and the wet scrubbing unit both can be provided with means for supplying the same virgin absorbent thereto.

Downstream of the two units, we can also provide a mixer for combining the portion of the solids from the separator which has not been fed to the scrubber where the settled sediment from the scrubbing liquid, namely, the sum product of the scrubbing tower to form the mixed building material described above. According to yet another feature of the invention, a means is provided for branching a partial stream of the flue gas from the solids separator to the scrubber and another stream to a mixer where the outflow from the scrubber is combined with the partial stream from the separator before the mixed flue gases are channeled to the stack for release into the atmosphere.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating an apparatus for carrying out the process of the present invention.

SPECIFIC DESCRIPTION

The drawing shows a supply bin 1 for feeding an absorbent (virgin absorbent) in the form of an alkaline earth compound, preferably calcium carbonate, to a mill drying apparatus 2 (see the aforementioned patent) where the absorbent is comminuted and homogeneously mixed with the fuel which is also milled therein. The fuel is preferably bituminous coal or brown coal.

The fuel/absorbent mixture is then fed to a boiler combustion chamber 3 of a power plant, the steam from which is used to drive the electric-energy-generating turbines.

Since the finely divided absorbent is present within the fuel, it begins to react with the sulfur dioxide and other toxic components of the flue gas stream directly within the boiler as soon as these components are formed. Thus desulfurization begins in the boiler and continues along the path of the flue gas to a solids/gas separator, in this case an electrostatic precipitator 4.

The solids are collected at the bottom of this electrostatic precipitator and are partly discharged as represented at 14.

The flue gas is supplied from the electrostatic precipitator 4 via a line 20 in a partial stream 21 to a scrubbing column 5 and a partial stream 22 to a mixer 7.

Thus, downstream of the separator 4, we provide a wet scrubbing unit having a scrubbing column 6 through which at least a portion of the flue gas passes, the scrubbing column 5 being provided with nozzles 6 adapted to bring about an intimate contact between the flue gas and a scrubbing liquid.

The scrubbed flue gas stream is delivered to the mixer 6 in which it is combined with the dry desulfurized portion of the flue gas from line 22 and the mixture is then discharged into the environment through the stack 8.

The dry flue gas emerging from the boiler 3 has a temperature, for example, of 140° C. The wet flue gas downstream of the scrubbing tower 5 has a temperature only of about 50° C. The two streams are mixed in the mixing device 7 so that the mixture has a temperature of about 95° C.

The solids from the separator 4 contains, in addition to unreacted absorbent, the absorption reaction product and fly ash.

A portion of these solids are delivered by line 9 to the scrubbing liquid which is supplied by the scrubbing liquid preparation tank 10 to the scrubbing column 5. Thus the scrubbing liquid entering the column is a suspension of this secondary absorbent in the scrubbing liquid.

Virgin absorbent can be additionally introduced into the scrubbing liquid via the line 11 opening into the tank.

The residue of the wet desulfurization, e.g. a gypsum containing sludge, is carried off via line 12 by the pump 13 and is fed together with the unused solids via line 14 to a mixer 15 in which the settable or hardenable building product is formed. This product can be discharged at 16 for disposal or use as a structural material.

SPECIFIC EXAMPLE

The following specific example relates to a power plant having a power output of 600 MW.

The dry desulfurization is carried out by mill drying the fuel, e.g. bituminous coal or brown coal as described in the aforementioned patent, which can contain 0.5% by weight sulfur, with 2% by weight of calcium carbonate ($CaCo_3$) as an absorbent. The calcium carbonate and the fuel are mill dried in the unit 2.

The addition of this absorbent reduces the sulfur dioxide content of the flue gases in the boiler from 2800 mg $SO_2$ per $m^3$ (STP) to 1290 mg $SO_2$ per $m^3$ (STP).

After the dry desulfurization, 80% of the flue gas is passed through the scrubber while the balance is mixed with the scrubbed product in the mixer 7. The scrubbed product has a residual sulfur dioxide content of 130 mg $SO_2$ per $m^3$ (STP). The temperature of the scrubbed gas after the wet desulfurization is about 65°.

In the mixing chamber 7 it is combined with the 20% of the flue gas which was bypassed directly to the mixing chamber from the separator 4 at a temperature of 140° C. to produce a mixture containing only 362 mg $SO_2$ per $m^3$ (STP) at a temperature of 80° C. Such a gas can be discharged into the atmosphere without reheating and is within the sulfur emissions standards.

In the solids separator 4, 50 tons of solid product are collected per hour containing 22.5% by weight calcium oxide and 15.3% by weight calcium sulfate. 25% of these solids, namely, 12.5 tons per hour, are fed as the secondary absorbent into the scrubbing liquid entering the column 5. It appears that the lime content of this composition ensures effective use in the scrubbing absorption process.

Since this supplies the full requirement of 2.5 tons per hour of calcium oxide, no additional absorbent is necessary for the wet scrubbing.

The portion of the solids which is not used as the secondary absorbent is mixed in at 15 with the sludge obtained from the scrubber.

The resulting mixture consists primarily of 17% by weight CaO, 11% by weight $CaSo_4$ and 15% by weight $CaSO_4.2H_2O$. The balance is water and other fly ash components.

A significant content of calcium oxide and calcium sulfate make the mixture a hydraulic binder which is settable and hardenable and can be cast into blocks or bricks with a compressive strength, upon setting, in excess of 10 $N/mm^2$ compressive strength.

We claim:

1. A method of removing sulfur dioxide from fly ash containing flue gas of a fossil fuel combustion, comprising the steps of:
   (a) dry desulfurizing said flue gas by contacting same during said combustion with a finely divided particulate absorbent consisting essentially of calcium hydroxide, oxide or carbonate and thereafter separating dry solids, including said absorbent, reaction products of sulfur dioxide with said absorbent and fly ash from the flue gas;
   (b) milling at least some of the dry solids separated from the flue gas in step (a)
   (c) treating at least some of the dry solids separatd from the flue gas in step (a) with steam
   (d) wet scrubbing at least part of said flue gas following the dry desulfrurization in step (a) with an aqueous scrubbing liquid containing water and a secondary absorbent, said secondary absorbent being at least part of the dry solids separated from the flue gas in step (a) and milled and treated in steps (b) and (c);

(e) introducing a previously unused quantity of said finely divided particulate absorbent into the scrubbing liquid in step (b) whereby a gypsum-containing sludge is formed in said scrubbing liguid upon collection thereof subsequent to wet scrubbing; and (f) recovering a gypsum-containing sludge from said scrubbing liquid after the wet scrubbing in step (b) for use as a structural material.

2. The method defined in claim 1 wherein the absorbent introduced into step (a) and the previously unused absorbent of step (d) are the same absorbent compounds.

3. The method defined in claim 1 wherein the absorbent in step (a) is mixed with a fuel prior to combustion thereof to generate said flue gas.

4. The method defined in claim 1, further comprising the step of mixing said sludge with a portion of the dry solids recovered from step (a) and not supplied to the scrubbing liquid as said secondary absorbent, thereby forming a settable composition.

5. The method defined in claim 1, further comprising branching the flue gas after the separation of the dry solids therefrom, in part througyh a scrubber for the wet scrubbing of step (d) andd in part to a mixer in which the part of the flue gas not supplied to said scrubber is combined with flue gas from said scrubber to form a mixture which is discharged into the atmosphere.

* * * * *